(12) United States Patent
Kudryavtsev et al.

(10) Patent No.: US 12,486,556 B2
(45) Date of Patent: Dec. 2, 2025

(54) METHOD FOR VERSATILE ION-EXCHANGE EXTRACTION OF LITHIUM FROM NATURAL OR TECHNOLOGICAL LITHIUM-CONTAINING BRINE BY USING A LITHIUM-SELECTIVE INORGANIC SORBENT

(71) Applicants: Pavel Kudryavtsev, Rehovot (IL); Nikolai Kudriavtsev, Haifa (IL)

(72) Inventors: Pavel Kudryavtsev, Rehovot (IL); Nikolai Kudriavtsev, Haifa (IL)

( * ) Notice: Subject to any disclaimer, the term of this patent is extended or adjusted under 35 U.S.C. 154(b) by 654 days.

(21) Appl. No.: 17/877,925

(22) Filed: Jul. 30, 2022

(65) Prior Publication Data
US 2024/0035117 A1 Feb. 1, 2024

(51) Int. Cl.
| | | |
|---|---|---|
| *C22B 26/12* | (2006.01) | |
| *B01D 15/18* | (2006.01) | |
| *B01D 15/20* | (2006.01) | |
| *B01D 15/36* | (2006.01) | |
| *B01J 47/02* | (2017.01) | |
| *B01J 47/14* | (2017.01) | |
| *B01J 49/06* | (2017.01) | |
| *B01J 49/53* | (2017.01) | |

(Continued)

(52) U.S. Cl.
CPC .......... *C22B 26/12* (2013.01); *B01D 15/1871* (2013.01); *B01D 15/1885* (2013.01); *B01D 15/203* (2013.01); *B01D 15/362* (2013.01); *B01J 47/02* (2013.01); *B01J 47/14* (2013.01); *B01J 49/06* (2017.01); *B01J 49/53* (2017.01); *B01J 49/60* (2017.01); *C22B 3/42* (2013.01); *C22B 7/006* (2013.01)

(58) Field of Classification Search
CPC ........... C22B 26/12; C22B 3/42; C22B 7/006; B01D 15/1871; B01D 15/1885; B01D 15/203; B01D 15/362; B01J 47/02; B01J 47/14; B01J 49/06; B01J 49/53; B01J 49/60
See application file for complete search history.

(56) References Cited

U.S. PATENT DOCUMENTS

2021/0077990 A1    3/2021  Snydacker et al.

FOREIGN PATENT DOCUMENTS

| CN | 201825992 U | * | 5/2011 |
| RU | 2185882 | | 3/2001 |

(Continued)

*Primary Examiner* — Waqaas Ali

(57) ABSTRACT

Provided are an apparatus and a method for ion-exchange extraction of lithium from natural or technological brine by using a lithium-selective inorganic sorbent operating on a principle of an ion sieve. The apparatus contains a plurality of ion-exchange columns arranged and interconnected in sequence. Flows of the brine, flush water, acidic desorption solution, and outputs, of the processed products are controlled via switchable shut-off valves. The method can be carried out by operating the apparatus in a parallel or a serial mode of column operations. In the parallel mode, all columns work simultaneously in the same manner. In the serial mode of operation, the columns work individually with a shift of the sorption-flushing-desorption-flushing cycles sequentially and with a transfer of the processed brined sequentially from the first column to the last column and from the last column to the first one thus providing continuity of the lithium-extraction process.

8 Claims, 3 Drawing Sheets

(51) Int. Cl.
 *B01J 49/60* (2017.01)
 *C22B 3/42* (2006.01)
 *C22B 7/00* (2006.01)

(56) References Cited

FOREIGN PATENT DOCUMENTS

| | | | |
|---|---|---|---|
| WO | 2021135946 A | 7/2021 | |
| WO | WO-2021135946 A1 * | 7/2021 | ............... C22B 3/24 |

* cited by examiner

METHOD FOR VERSATILE ION-EXCHANGE EXTRACTION OF LITHIUM FROM NATURAL OR TECHNOLOGICAL LITHIUM-CONTAINING BRINE BY USING A LITHIUM-SELECTIVE INORGANIC SORBENT

FIELD OF THE INVENTION

The invention relates to the field of chemical technology and hydrometallurgy and, in particular, to the use of selective inorganic sorbents for the extraction of lithium from lithium-containing natural or technological brine with high content of alkali and alkaline earth metal ions. More specifically, the invention relates to an apparatus and method for versatile continuous ion-exchange extraction of lithium from natural or technological brine using lithium-selective inorganic sorbents.

DESCRIPTION OF THE PRIOR ART

Lithium has historically been mined from two different sources—continental brine and hard rock minerals. Lithium is currently used in producing glass, ceramics, medical substances, and metallurgical products, as well as in areas such as nuclear energy, aviation, automotive industry, etc. Demand for lithium will no doubt rise as cars become more environmentally friendly and electricity becomes more environmentally friendly. Global sales of lithium salts are worth more than $1 billion a year because this element is becoming an important component in the lithium-ion batteries that now power everything from smartphones and power tools to electric vehicles.

Lithium demand is forecast to grow by more than 300% in the coming years. Moreover, electric companies are expanding the production of solar energy and require lithium-ion batteries with high energy density for storage. In this regard, the demand for lithium will grow rapidly. These factors have created an acute dependence of many global industries on lithium, which has led to a global search for new sources of this element.

At present, hydromineral raw materials are gradually becoming the main source of lithium. At the same time, in world practice, the main attention is paid to developing methods and apparatuses for processing lithium-containing hydromineral raw materials. Lithium extraction from natural brine by precipitation sparingly soluble salts is most commonly used in practice. However, what is most promising from an ecological point of view is sorption methods for extracting lithium from natural or technological brine that is poor in lithium content. This is because these sources contain the main world reserves of lithium. Due to the complexity of the salt composition of hydromineral raw materials, highly selective inorganic ion-exchange materials become most promising for lithium extraction under the above conditions.

When extracting lithium from natural or technological hydro-mineral resources using highly selective inorganic ion-exchange sorbents, nitrate solutions containing lithium nitrate as the main component, as well as a certain amount of sodium, potassium, magnesium, and calcium nitrates are formed.

An example of an ion exchange sorbent highly selective to lithium is described, e.g., in U.S. Pat. No. 10,434,497 issued on Oct. 8, 2019 to Pavel Kudryavtsev et al. U.S. Pat. No. 4,904,383 issued on Feb. 27, 1990, to Auerswald; David C, discloses a system for demineralizing water. Water is demineralized by passage through a water demineralization system, which consists of a serial of at least three ion exchange resin zones. The sequential serial comprises a strong acid cation (SAC) resin zone, a first anion resin zone, and a weak acid cation (WAC) resin zone. The SAC resin zone comprises a SAC resin for removing cations from the water, the first anion resin zone contains an anion resin for removing anions from the water, and the WAC resin zone comprises a WAC resin for removing cations from water without substantially splitting any salts present in the water. Means for connecting each resin zone in the serial are provided so that water can pass sequentially through the system.

U.S. Pat. No. 6,972,091 issued on Dec. 6, 2005, to Becucci, Piero, discloses an ion exchange resin plant for demineralizing or softening water with an arrangement that allows the plant to operate continuously. The plant tank is divided into two separate compartments that work simultaneously. One compartment affects the demineralization of water while the ether compartment regenerates the ion-exchanging resins.

Also known as Russian Patent No. 2185882, issued on Mar. 1, 2001, to Nikolaev et al. This patent relates to an installation for ion-exchange water purification. The disclosure relates to installations for ion-exchange water purification and can be used in the field of water treatment. The plant contains at least one ion-exchange filter, collector tubes for treated water input and purified water output connected to each filter through appropriate switchable shut-off valves, two output headers equipped with switchable shut-off valves at the output and connected to the upper and lower distribution devices of each filter, and sources of wash water and regeneration solution with supply lines. The input line of flushing water is connected through shutoff valves to the inputs of two output collector tubes and the input line of the regeneration solution. The outputs of the output collector tubes are connected to the line for supplying waste streams for neutralization. The discharge manifold connected to the lower distribution device of each filter is equipped with a drain pipeline with switchable shut-off valves.

U.S. Pat. No. 7,309,436, issued on Dec. 18, 2007, to Jensen et al., discloses a process for removing perchlorate ions from water streams. Methods and systems for removing perchlorate from water involve using a plurality of vessels containing an ion exchange resin having an affinity for perchlorate ions. The perchlorate-contaminated water is passed over the resin in some but not all of the plurality of vessels operating in parallel to one another, thereby removing perchlorate ions from the water stream and generating reduced perchlorate content product water streams. A subset of the plurality of vessels is removed from service, their resin is removed and replaced, and then the vessels are returned to service.

U.S. Pat. No. 10,604,414, issued on Mar. 31, 2020, to Featherstone et al., discloses a system and a process for recovery of lithium from geothermal brine. The system and process are configured to recover zinc, manganese, and lithium sequentially from a Salton Sea Known Geothermal Resource Area brine. The system and process include an impurity removal circuit; then a continuous counter-current ion exchange (CCIX) circuit selectively recovering lithium chloride from the brine flow and concentrating it using the COX unit. The system also contains a lithium chloride conversion circuit for converting lithium chloride to lithium carbonate or lithium hydroxide product.

Chinese Patent Application Publication WO2021135946A1 Published on Jul. 8, 2021. Inventors: Jia Yu et al, disclose a method for extracting lithium from a Salt Lake brine raw material, desorption liquid, low-magnesium water, and adsorption tail liquid, which pass respectively through a brine feeding pipeline, a desorption liquid feeding pipeline, a low-magnesium water top desorption liquid feeding pipeline, and an adsorption tail liquid top desorption liquid feeding pipeline. Respectively, they are located above and below a rotary disc of a multi-ay valve system. After entering the corresponding adsorption column, the apparatus utilizes a predetermined duct and channel within the multi-way valve system. The entire process procedure is completed by outputting the processed brine from an adsorption tail liquid discharge pipeline, a qualified desorption liquid discharge pipeline, and a lithium-containing brine discharge pipeline. The ion-exchange columns are connected in series or parallel utilizing channels in the multi-way valve system.

US Patent Application Publication No. 20210077990, published on Mar. 18, 2021 (Inventors: Snydarker, et al.), relates to the extraction of lithium from liquid resources such as natural or synthetic brine, leachate solutions from clays and minerals, and recycled products. For lithium extraction from the liquid resources, an ion-exchange reactor has a tank, ion exchange particles, particle traps, and provision to modulate the pH of the liquid resource.

Ion exchange particles are loaded into an ion exchange system that contains a brine circuit consisting of four brine reactors for brine mixing and water washing that incorporate large conical tanks, external settling tanks, overhead stirrers, pH controllers, a water washing circuit, and an acid circuit consisting of two acid reactors for acid elution incorporating smaller conical tanks, external settling tanks, and overhead stirrers. Each tank is fitted with a spraying system at the top of the tank with one or more nozzles positioned to spray aqueous washing solution to wash ion-exchange particles off the sides of the tanks and down to the bottom of the tanks.

SUMMARY OF THE INVENTION

Figure 1:
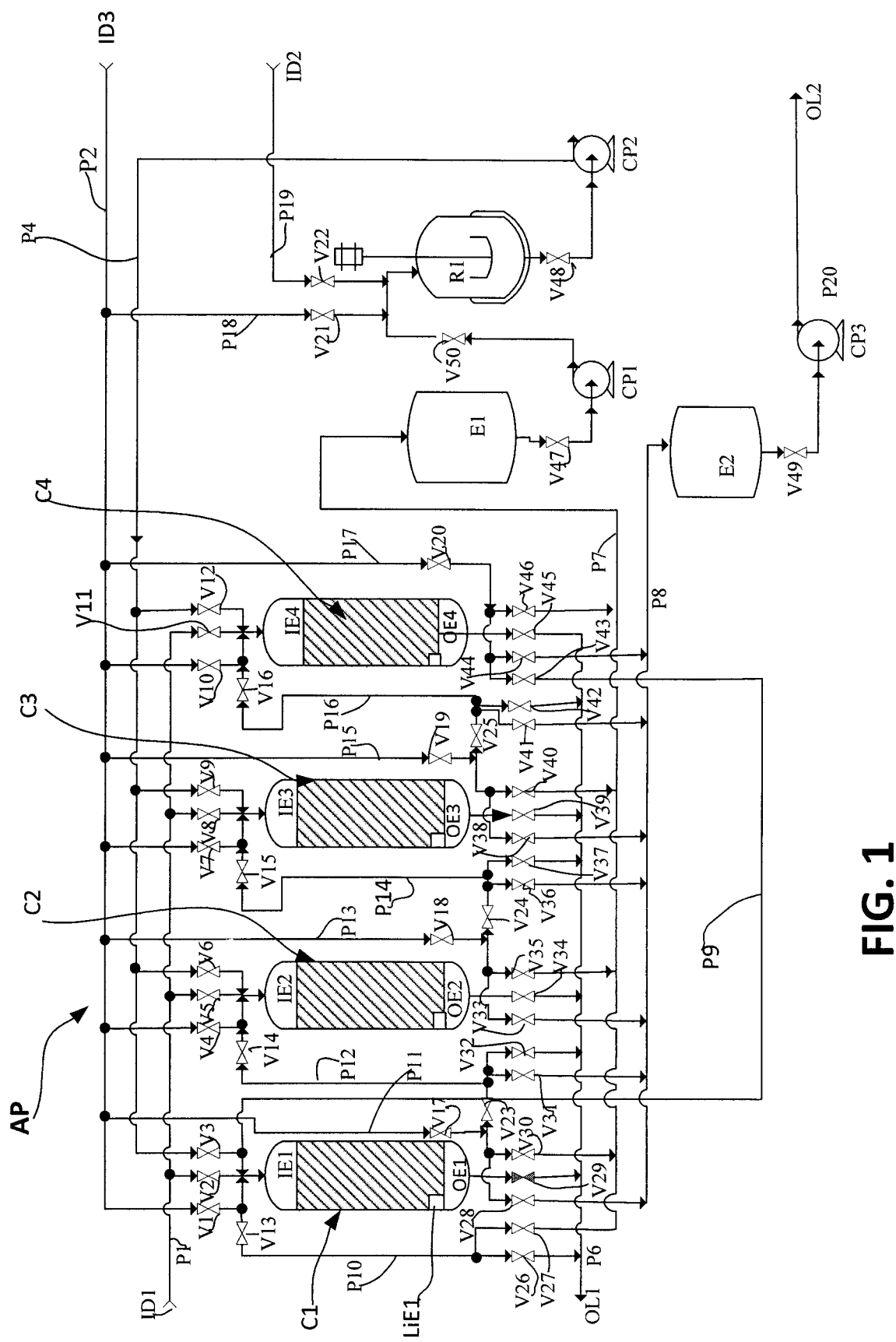
FIG. 1 is a technological scheme of an apparatus of the present invention for lithium extraction from natural or technological brine.

The disclosure relates to an apparatus and method for versatile continuous ion-exchange extraction of lithium from natural or technological brine using a lithium-selective inorganic sorbent. The apparatus contains a brine-processing system consisting of a plurality of ion-exchange columns for lithium extraction, an acid desorption tank, a storage tank, and an acid dilution reactor. Each column is filled with a lithium-extraction composition operating on the principle of an ionic sieve and has a column input unit for inputting lithium-containing natural or industrial brine and a column output unit for outputting a processed brine from each ion-exchange column. The apparatus is also provided with a brine input source for supplying an untreated lithium-containing brine to the columns, a processed brine output manifold for outputting the processed brine from each column, and a concentrated acid solution supply source for supplying a concentrated acid solution to the acid dilution reactor for preparing an acidic desorption solution. The brine-processing system also includes a pipeline for supplying the acidic desorption solution from the acid dilution reactor to each column. After each sorption-desorption cycle, the columns are flushed with flush water supplied from a flush water source for cleaning the columns from a lithium-containing residue remaining in the columns, thus forming a solution containing the lithium-containing brine residue. In order to keep the apparatus in a continuous mode of operation and for imparting to the apparatus versatility, the apparatus is provided with five groups of switchable shut-off valves, wherein a first group of switchable shut-off valves controls input of the untreated lithium-containing brine to the brine input unit of each column from the brine input source, a second group of switchable shut-off valves controls output of the processed brine from each column, a third group of switchable shut-off valves controls supply of the acidic desorption solution from the acid dilution reactor to each columns, a fourth group of switchable shut-off valves controls supply of flush water to each of the columns for flushing the columns from the lithium-containing brine residue remained after each sorption-desorption cycle performed in the columns, and a fifth group of switchable shut-off valves controls supply of the concentrated acid solution from the source of a concentrated acid solution to the acid dilution reactor. Each shut-off valve of the first, second, third and fourth group is associated with one of the columns.

Due to the provision of the five-valve above groups and appropriate valve switching pattern, a method of the invention can be realized by operating the apparatus in a serial mode of operation or a parallel mode of operation. In the parallel mode, all column constantly works in the same process operation. In a serial mode, the columns of the apparatus work like a single multiple-step large column, in which the columns work simultaneously in different stages of the process. This is achieved by switching the valve groups. As a result, a higher lithium extraction efficiency is achieved.

DETAILED DESCRIPTION OF THE INVENTION

The invention relates to an apparatus for ion-exchange lithium extraction from natural or technological brine. More specifically, as mentioned earlier, the apparatus concerns a lithium recovery technology that can be carried out in a continuous and versatile mode of operation.

The term "brine," as used in this patent specification, covers any natural or process solution containing lithium.

The apparatus of the present disclosure will be further described in FIG. 1, which is a technological scheme of an apparatus of the present invention for the extraction of lithium from natural or technological brine, starting now referred to merely as an "apparatus".

As can be seen from FIG. 1, the proposed apparatus, designated as a whole by the symbol AP, contains a plurality, for example, four ion-exchange columns C1, C2, C3, and C4; from now on, "columns" connected to a brine input source ID1 by a brine input pipeline P1 through respective switchable shut-off valves, which are described below. The brine input source ID1 supplies the columns with an untreated or a primary natural, or industrial lithium-containing brine.

The apparatus AP is also provided with a processed brine output manifold OL1 for outputting a treated brine formed after the extraction of lithium and other waste products. The processed brine output manifold OL1 is connected to a waste output pipeline P6, linked to each column via a respective shut-off valve described later.

It should be noted that columns C1, C2, C3, and C4 are shown in an amount of four only as a preferable example and, as can be seen later after familiarization with the operation of the apparatus AP, the apparatus may consist of at least two or more than four columns.

An ion-exchange column suitable for the invention may be any conventional ion-exchange column wherein a filtering layer is formed from an ion-exchange material.

There exists a great number of designs of sorption columns differing in solution supply methods (pressured or non-pressurized), designs of distribution and drainage devices, volumes, and methods of loading the ion exchanger, etc. Ion-exchange columns may have one, two, or more drainage devices for supplying and discharging reagents. Sometimes, a supporting layer may be installed between the sorbent and the lower drainage device. The drainage dive may be made from a porous plate or consist of two perforated disks, a filter cloth sandwiched between them, etc. A column may have an upper distributing device that should ensure e uniformity of the solution flow through the layer of ion-exchange material, etc. In any case, a specific design and structure of an ion-exchange column used in the apparatus of the invention are beyond the scope of the present invention if it accomplishes its main ion-exchange function and operates on the principle of an ionic sieve.

An ionic sieve is an inorganic ion-exchange sorbent that exhibits the so-called ion-sieve effect resulting from separating ions in solution according to the difference in their ionic radii. The sizes of crystallographic positions in the material's crystal structure correspond to certain ions, and larger ions cannot enter the indicated positions. Thus, the ion-sieve effect ensures high selectivity in sieve effect sorbents. A unique feature of the method, according to the present invention, is that this method allows using inorganic lithium-selective ion-exchange sorbents with a specific structure, which provides high selectivity, especially for lithium ions.

The top ends, i.e., brine input units IE1, IE2, IE3, and IE4, of the ion-exchange columns C1, C2, C3, and C4, are connected to a brine supply source ID1 through a brine input pipeline P1 and further via respective switchable shut-off valves V2, V5, V8, V11.

Switchable shut-off valves mentioned herein may be any commercially available valves capable of passing fluid or blocking the pass of fluid therethrough under manual or remote command. Many switchable shut-off valves exist of various types, and the construction or design of such a valve is beyond the scope of the present invention. Hereinafter, the shut-off valve will be referred to merely as "valves".

The bottom ends, i.e., column output units OE1, OE2, OE3, and OE4, of the columns C1, C2, C3, and C4, are connected to a waste output pipeline P6 via manifold via respective valves V29, V34, V39, V45 and further with a processed brine output manifold OL1.

For passing the brine flow through the columns C1, C2, C3, and C4 during their operation in a sequential mode, the apparatus AP is additionally equipped with pipelines P10, P12, P14, P16, and valves V13, V14, V15, V16, V23, V24, V25, V26, V27, V31, V32, V36, V37, V41, V42, V43, and V44. The positions and functions of the aforementioned valves will be explained below.

A source of flush water ID3 is connected to flush water supply pipeline P2, which is connected through valves V1, V4, V7, and V10 to the brine input units IE1, IE2, IE3, and IE4 of the respective columns C1, C2, C3, and C4, as well as through valves V17, V18, V19, V20 and respective pipelines P11, P13, P15, and P17 to the output units OE1, OE2, OE3, and OE4 of the aforementioned columns C1, C2, C3, and C4 for flushing the pipelines from the lithium-containing brine residue, i.e., residual solutions remained after the processes of sorption and desorption.

The acidic desorption solution is prepared in a system consisting of an acid dilution reactor R1, an acid desorption tank E1 for containing a circulating acidic desorption solution, two pumps CP1, CP2, an acid solution supply pipeline P19 that receives the acid solution from a concentrated acid solution supply source ID2, hereinafter "acid input pipeline", a valve V21 for connecting the flush water supply pipeline P2 with the acid dilution reactor R1, a valve V22 for connecting the acid solution supply pipeline P19 with the acid dilution reactor R1, and a valve 47 that connects the acid desorption tank E1 with the pump CP1 that feeds the acidic desorption solution to the acid dilution reactor R1 through the pipeline P21 via a valve V50.

The acidic desorption solution system further includes a pipeline P18 for the supply of flushing water to the acid dilution reactor R1; a pipeline P4 for the supply of the acidic desorption solution from the acid dilution reactor R1 by the pump CP2 to the brine input units IE1, IE2, IE3, and IE4 of the respective columns C1, C2, C3, and C4 via valves V3, V6, V9, and V12; and an acid circulating desorption solution collection line P7.

The valve V21 controls the flow from the acid input pipeline P19 to the acid dilution reactor P1. The valve V47 controls the flow from the acid desorption tank E1 to the pump CP1. The valve V50 controls the flow from the pump CP1 to the acid circulating desorption solution tank E1. Valve 48 controls the flow from the acid desorption tank E1 to the acidic desorption solution supply pipeline P4.

On the other hand, the waste desorption solution pipeline P7 is connected to the input of the acid circulating desorption solution tank E1, which receives the waste desorption solution from the output units of each of the columns C1, C2, C3, and C4 via valves V30, V35, V40, and V46.

The output units of the columns OE1, OE2, OE3, and OE4 are connected to the desorption flow supply pipeline P8, which is connected to the storage tank E2, from where, through a storage-tank valve V49 with the help of a pump CP3, the desorption solution is fed through the storage tank draining pipeline P20 and a storage tank draining manifold OL2 to further processing.

Furthermore, for operation in a serial mode, the apparatus is provided with a pipeline P9, which through the respective valves V43 connects the column output unit OE4 of the last column C4 with the input unit IE1 of the first column C1.

Figure 2:
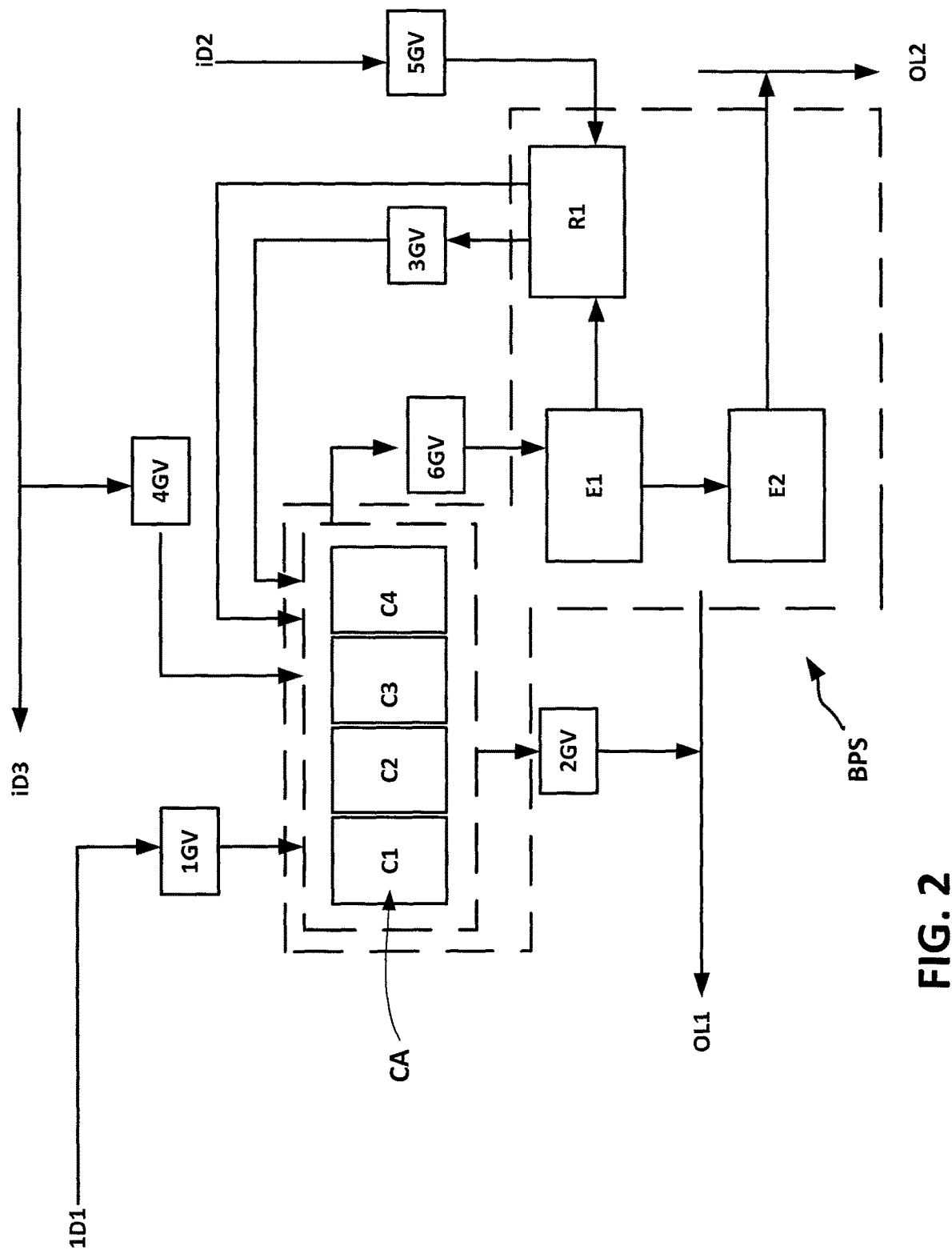
FIG. 2 is a block diagram illustrating the main valve groups and their interconnection with components of the processing system of the apparatus.

Thus, the architecture of the apparatus AP of the invention, shown in FIG. 2 as a block diagram illustrating the main valve groups and their interconnection with components of the brine processing system of the apparatus can be summarized as follows.

The apparatus ap contains a brine-processing system BPS (FIG. 2) that includes a column assembly CA consisting of a plurality (e.g., four) of the lithium-extracting ion-exchange columns C1, C2, C3, and C4 for extraction of lithium (hereinafter referred to as ion-exchange columns or merely as columns), the acid desorption tank E1, the storage tank E2 and the acid dilution reactor R1. Each column (C1, C2, C3, C4) is filled with a lithium-extraction composition operating on the principle of an ionic sieve and has a column input unit (IE1, IE2, IE3, IE4) for inputting lithium-containing natural or industrial brine and a column output unit (OE1, OE2, OE3, OE4) for outputting a processed brine from each ion-exchange column (C1, C2, C3, C4), The apparatus AP is also provided with a brine input source ID1 for supplying an untreated lithium-containing brine to the columns (C1, C2, C3, C4), and the processed brine output manifold OE1 for outputting the processed brine from each column (C1, C2, C3, C4), and the concentrated acid solution supply source ID2 for supplying a concentrated acid solution through the pipeline P21 to the acid dilution reactor E1 for preparing an acidic desorption solution. The brine-processing system, also includes the pipeline P21 for the supply of the acidic desorption solution from the acid dilution reactor R1 to each column (C1, C2, C3, C4). After each sorption and desorption operation, the columns (C1, C2, C3, C4) are flushed with flush water supplied from a source ID3 of flush water for cleaning the columns (C1, C2, C3, C4) from a lithium-containing brine residue remained in the columns (C1, C2, C3, C4). In order to keep the apparatus AP in a continuous mode of operation and for imparting to the apparatus versatility, the apparatus is provided with five groups of switchable shut-off valves, wherein a first group 1GV of switchable shut-off valves is used for controlling input of the untreated lithium-containing brine to the brine input unit of each column from the brine input source, a second group of switchable shut-off valves for controlling output of the processed brine from each column, a third group of switchable shut-off valves for controlling supply of the acidic desorption solution from the acid dilution reactor to each of the columns, a fourth group of switchable shut-off valves for controlling supply of flush water to each of the columns for flushing the columns from the lithium-containing brine residue remained after processes of sorption and desorption performed in the columns, and a fifth group of switchable shut-off valves for controlling supply of the concentrated acid solution from the supply source of the concentrated acid solution to the acid dilution reactor. Each shut-off valve of the first, second, third, and fourth group is associated with one of the columns.

The lithium extraction composition, which is also known as a lithium-extracting sorbent or lithium selective inorganic ion-exchange sorbent that fills the columns, is a composition selected from the group consisting of lithium-extracting sorbents based on mixed lithium, niobium, and zirconium oxides, lithium-extracting sorbents based on mixed lithium, niobium and tungsten oxides, and lithium-extracting sorbents based on mixed lithium, manganese, and aluminum oxides.

Methods of obtaining the aforementioned sorbents are described in U.S. Pat. No. 11,260,366, issued on Mar. 1, 2022, to P. Kudryavtsev et al., and U.S. Pat. No. 11,179,715, issued on Nov. 23, 2021, to P. Kudryavtsev et al., and now pending U.S. patent application Ser. No. 17/688,047 filed on Mar. 7, 2022 (inventors: P. Kudryavtsev et al.).

The apparatus works as follows. There are two options for the installation operation: a parallel mode of operation mode and a serial mode of operation.

Operation of the Apparatus AP in the Parallel Mode

For the operation of the columns C1, C2, C3, and C4 in a parallel mode, the untreated primary brine is fed from the brine input pipeline ID1 to the input units IE1, IE2, IE3, and IE4 of the Ion-exchange columns C1, C2, C3, and C4 via the valves V2, V5, V8, and V11, respectively.

It is assumed that before initiation of the first, i.e., the sorption cycle, the columns have been cleaned from the residual brine and another residue by washing with flush water delivered from the source of flush water ID3. In the sorption cycle, an untreated or a primary natural or industrial lithium-containing brine is fed from the input source ID1 via the pipeline P1 to the input unit of each column and passed through the lithium-extracting ion-exchange sorbent for selective sorption of lithium on the principle of the ionic sieve.

The sorption operation in each ion-exchange column (C1, C2, C3, C4) is continued until the concentration of lithium in the output of the column, i.e., in the processed brine, reaches a predetermined high level, e.g., of about 90% or higher than 90% of the concentration of lithium in the initial brine. Following this, the next step of the cycle, i.e., a column washing, is started.

The column is closed for the initial brine supply and switched for washing before the desorption in the sorption-washing-desorption-washing cycle when After being processed in the columns C1, C2, C3, and C4, the processed brine is transferred from the columns through their respective column output units OE1, OE2, OE3, and OE4 and via respective switchable shut-off valves V29, V34, V39, and V45 to the pipeline P6 and then to the processed brine output manifold Oil for discharge from the system or for any other external reuse.

Each of the above columns, C1, C2, C3, and C4, is switched to a starting mode with a certain delay of time equal to the total desorption cycle, washing from the residual brine, and washing after completion of the desorption.

The above cycle is repeated simultaneously with the aforementioned time shift on each column C2, C3 and C4 respectively Thus, the apparatus AP works almost continuously, combining the processes of sorption and desorption.

Operation of the Apparatus in Serial Mode

During the operation of the apparatus AP in an established regime (i.e., when the apparatus is completely filled with respective liquids) in the serial mode, the untreated brine, which has a predetermined initial concentration of lithium, is fed during the first cycle to the ion-exchange column C1 via its input unit IE1 through the valve V2. In this case, valves V5, V8, and V11, as well as valves V29, V34, and V39 are closed. The valve V45 remains open for letting the processed brine out, of the system.

The sorption operation in the first column, C1 (as well as in subsequent ion exchange columns C2, C3, and C4) is continued until the concentration of lithium in the output of the column, i.e., in the processed brine, reaches a predetermined high level, e.g., of about 90% or higher than 90% of the concentration of lithium in the initial brine. Following this, the next step of the cycle, i.e., a column washing, is started.

The brine that has passed through ion-exchange column C1 is sent to the column C2 through valve V23 to line P12, which is connected via valve V14 to the brine input unit of the column C2. Similarly, the brine that has passed through the column C2 is sent to the column C3 through the valve V24 to the pipeline P14, which is connected through the valve V15 to the brine input unit of the column C3. Next, the brine that has passed through the column C3 is sent to the column C4 through the valve V25 to the pipeline P16, which is connected through the valve V16 to the brine input unit of the column C4.

The spent brine is fed from the column C4 through the valve V45 to spent brine output manifold OL1 and then to the waste processing system, which is not shown.

In the serial mode of the operation of the columns, the column C1 is saturated first. In this case, it is disconnected from the other columns and is subsequently switched to the washing and desorption operations.

After the washing and desorption operations are finished in the column C1, the valves V2 and V29 are closed, the valve V5 is open, and the column C2 begins to operate in the same manner as the column C1 in the previous case, i.e., the washing and desorption processes are repeated. On the other hand, the column C1 is turned into the last column of the running system. For this purpose, the solution treated in the column C4 is fed from column C4 through the valve V43 and the pipeline P9 to the brine input unit of column C1. Upon completion of brine treatment in columns C1 and C2, the column C3 is switched to the washing and desorption operations, and the cycle is repeated.

Further column switching in alternating cycles of sorption and desorption occurs in accordance with the switching matrix presented in Table 1 below,

TABLE 1

Column Switching Matrix in Terms of Sorption-Desorption Cycles after Completion of the First Cycle.

| | Cycle 1 | Cycle 2 | Cycle 3 | Cycle 4 | Cycle 5 |
|---|---|---|---|---|---|
| Brine input | C1 | C2 | C3 | C4 | C1 |
| Second column | C2 | C3 | C4 | C1 | C2 |
| Third column | C3 | C4 | C1 | C2 | C3 |
| Fourth column | C4 | C1 | C2 | C3 | C4 |
| Desorption after completion of the cycle | C1 | C2 | C3 | C4 | C1 |

During the second cycle, the untreated brine is fed to the ion-exchange column C2 via its input unit IE2 through the valve V5. In this case, the valves V2, V8 and V11, as ell as the valves V29, V34, and V39, are closed.

The brine that has passed through the ion-exchange column C2 is sent to the column C3 through the valve V24 to the pipeline P14, which is connected via the valve V15 to the brine input unit of the column C3. Similarly, the brine that has passed through the column C3 is sent to the column C4 through the valve V25 to the pipeline P16, which is connected through the valve V6 to the brine input unit of the column C4.

After completion of all washing and desorption operations on the column C1, during the second cycle, the column C1 is connected to the output unit of the column C4. This connection is made by dosing the valve V45 and opening the valve V43, which feeds the brine to be processed through the pipeline P9 to the input unit of the column C1. In this case, after passing through the column C1, the processed brine is fed via the valve V29 to the pipeline P6 and through the spent brine output manifold OL1 to the system for receiving the processed brine.

In the third cycle the untreated brine is fed to the ion-exchange column C3 via its input unit IE3 through the shut-off valve V8. In this case, valves V2, V5, and V11, as well as the valves V29, V39, and V45, are dosed.

The brine that has passed through the column C3 is sent to the column C4 via the valve V25 to the pipeline P16, which is connected via valve V16 to the brine input unit of the column C4, Similarly, the brine that has passed through the column C4 is sent to the column C1 through the valve V43 to the pipeline P9, which is connected to the brine input unit of the column C1.

Upon completion of all washing and desorption operations on column C2, within the third cycle, the column C2 is connected to the output unit OE3 of the column C1, This connection is made by closing the valve V29 and opening the valve V23, which passes the brine to be processed via the pipeline P12 to the input unit of the column C2. In this case, after passing through the column C2, the processed brine is fed through the valve V34 to the pipeline P6 and through the spent brine output manifold OL1 to the system for receiving the processed brine.

During the fourth cycle, the untreated brine is fed through the valve V11 to the column C3 via its input unit IE4. In this case, valves V2, V5, and V8 and valves V29. V34, and V45 are closed.

As mentioned above, the brine that passes through the column C4 is sent to the column C1 via the valve V42 to the pipeline P9, which is connected to the brine input unit IE1 of the column C1. The brine that has passed through the column C1 is sent to the column C2 through the valve V23 to the pipeline P12, which is connected via the valve V14 to the brine input unit IE2 of the column C2. Similarly, the brine that passes through the column C2 is sent to the column C3 through the valve V24 to the pipeline P14, which is connected through the valve V15 to the brine input unit IE3 of the column C3.

After completing all washing and desorption operations on column C3 within the fourth cycle, the column C3 is connected to the output unit OE2 of the column C2. This connection is made by closing the valve V34 and opening the valve V24, which passes the flow of the brine via the pipeline P14 to the input unit IE3 of the column C3. In this case, after passing through the column C3, the processed brine is fed through the valve V39 to the pipeline P6 and through the spent brine output manifold OL1 to the system for receiving the processed brine.

In its mode of serial connections of the columns, the fifth cycle of the system operation completely duplicates the first cycle. Thus, the apparatus AP operates in a continuous mode of alternating cycles of sorption and desorption.

Column Washing Operation

Upon completion of the sorption process, it is necessary to wash the columns to remove some of the remaining brine from the columns so that it could not get into the final product and introduce a contamination matter. Flushing is carried out by supplying dean water from the source of flush water ID3. For example, flushing of the column C1 is carried out by feeding water to the brine input unit IE1 of the column C1 through the valve V1. After washing, the spent water is sent from the column C1 to the brine system, not shown, via the valve V29 to the spent brine output manifold OL1. Each column is also washed after the completion of each desorption process. However, it can be done in various ways. As in the case of a post-brine flush, one option is to supply water to the top of the column from flush water supply source ID3, the pipeline P2, and the valve V1. At the same time, the flush water from the column C1 through the valve V30 enters the line P7 and then to the acid collection tank E1.

The above-described flushing scheme is performed if the process proceeds normally. However, if there has been some caking of the sorbent in the column, the flush water can be fed into the column output units the columns for loosening and washing out the hardened sorbent. In this case, for column C1, water from the flush water supply source ID3 is fed into the pipeline P11 and through the valve V17 into the column output unit OE1 of the column C1. While the wash water from the upper output of this column through the valve V13 and the pipeline P10 and through the valve V27 is supplied to the pipeline P7. Other columns are washed in the same way.

Flushing of the column C1 is carried out by feeding water to the brine input unit IE1 of the column C1 through the valve V1. After washing, the spent water is sent from the column C1 to the external brine system, not shown, via the valve V29 to the spent brine output manifold OL1. Each column is also washed after the completion of each desorption process. However, it can be done in various ways. As in the case of a post-brine flush, one option is to supply water to the input unit IE1 of column C1 from the flush water supply source ID3 through the pipeline P2 and the valve V1. At the same time, the flush water from the column C1 through the valve V30 enters the line P7 and then to the acid desorption tank E1.

Flushing of the column C2 is carried out by feeding water to the brine input unit IE1 of the column C2 through the valve V4. After washing, the spent water is sent from the column C2 to the external brine system, not shown, via the valve V34 to the spent brine output manifold OL1. After desorption, column C2 must also be washed. This washing can be carried out, as in the case of the first column, in two ways. One option, as in the case of a post-brine flush, is to supply water to the input unit IE2 of the column C2 from the flush water supply source ID3 through the pipeline P2 and the valve V4. At the same time, the flush water from the column C2 through the valve V35 enters the pipeline P7 and then to the acid desorption tank E1.

The flush water can be fed into the column output units of the column for loosening and washing out the sorbent hardened in that area. In this case, for the column C2, water from the flush water supply source ID3 is fed into the pipeline P13 and through the valve V18 into the column output unit OE2 of the column C2. While the wash water from the upper output of this column is passed through the valve V14 and the pipeline P12 and through the valves V23 and V30, water is supplied to the pipeline P7. Other columns are washed in the same way.

Desorption Operation

The desorption process is carried out using a diluted acid solution. The acid solution is prepared in the reactor R1. To do this, an acid solution is fed into the reactor K1 through the acid input pipeline P19 and valve 22. To dilute the acid, dean water is supplied from the flash water input pipeline ID3 through the valve V21 and pipeline P18. In some cases, spent acid with some lithium content and acid washings remained after the column washing. Desorption is sent from the acid desorption tank E1 through a pipeline P21 via the valves V47 and V50 by the pump CP1 back to the reactor R1.

The acid solution prepared in the reactor R1 is fed through the valve V48 by means of the pump CP2 to the pipeline P4. This pipeline is used to supply a diluted acid solution for desorption in the columns. For example, the diluted acid from the pipeline P4 is fed through the valve V3 and the brine input unit IE1 to the column C1.

Figure 3:
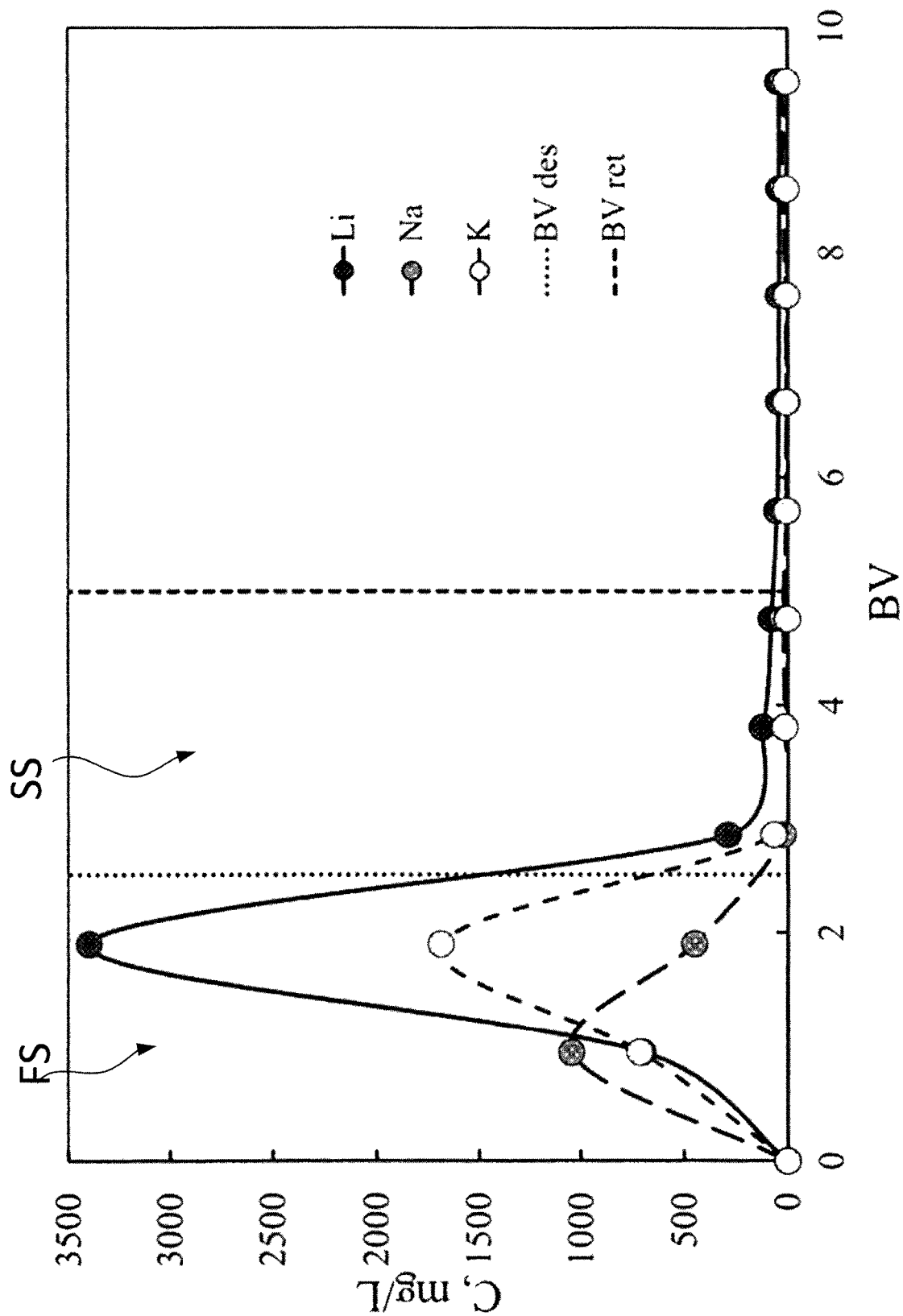
FIG. 3 is a graph that shows the effect of the acidic desorption solution volume that passed through a lithium-extraction column on the concentration of lithium in the obtained concentrate.

FIG. 3 is a graph that shows the effect of the desorption solution volume that passed through a lithium-extraction column on the concentration of lithium in the obtained concentrate. The abscissa axis shows the volume of the desorption solution that passed through the ion exchange column of the apparatus; the ordinate axis shows the lithium concentration in milligrams per liter of the solution.

FIG. 3 shows typical desorption output curves for a highly selective inorganic ion exchanger prepared in accordance with U.S. Pat. No. 11,260,366. In the drawing: BV is the number of column volumes of the desorption solution that passed through the ion exchange column of the apparatus AP. The curve BV des is the volume of the desorption solution sent to the tank E2 and to further processing. The curve BV ret is the volume of the desorption solution sent to the container E1 for reuse in the desorption step and to further preparation of the desorption solution.

It can be seen from FIG. 3 that all output curves can be divided into two sections, wherein the first section FS (the initial part of the curve) corresponds to the abscissa portion from 0 to about 2.5 column volumes. In this curve section, the obtained concentrate has a high lithium concentration. The maximum value of this concentration depends on many factors such as the type of the initial brine, chemical content of the initial brine, the size of the column, brine supply flow rate, etc. The high-lithium concentrate is directed to the container E2 to collect the finished product. After accumulation, the resulting solution from the storage tank E2 is transferred to pipeline P20 and to further reprocessing through the storage tank draining manifold OL2.

The second section SS of the curve corresponds to the abscissa portion from about 2.5 column volumes to five column volumes, wherein the desorption solution also contains lithium but in a small concentration, e.g., in the range of 100 to 500 milligram per liter of the desorption solution. Suppose lithium concentration in the processed desorption solution exceeds the value of 100 to 500 milligram per biter. In that case, the solution is still acceptable for further lithium extraction, and removal thereof from the system may not be economically justifiable.

The desorption solution formed in the part SS of the process is sent to the container E1 for accumulation and subsequent use in preparing the desorption solution in the reactor R1. The above-described division of the lithium extraction process into two sections makes it possible to improve apparatus efficiency and reuse the processed solutions. A ratio between the volumes of these solutions is determined based on measurements of the lithium concentration at the outlet of the ion exchange column. The concentration of lithium in desorption solutions can be determined using a direct measurement of its concentration e.g., with the aid of a Li-selective electrode (in order not to complicate the drawing, only one such electrode, LiE1, is shown in FIG. 1 on the column C1) or by periodically sampling the solution at certain intervals and determining the lithium content in these samples using, e.g., flame photometry (FP), atomic absorption (AA) or instruments operating on the principle of an inductively coupled plasma (ICP) method. Such devices are well known and do not constitute objects of the present invention.

More specifically, two types of solutions are formed during the desorption process. The first solution contains the maximum amount of lithium in the form of a lithium salt solution and the minimum amount of the spent acid. The second solution containing a small amount of lithium and a large amount of the spent acid is also formed. The first solution, through the valve V28 and the pipeline P8, is fed into the storage tank E2 to collect a finished lithium concentrate formed in the column C1 after the desorption. Similarly, the finished lithium concentrate is formed in columns C2, C3, and C4 wherefrom the finished lithium concentrates are sent to the storage tank E2 through respective valves V33, V38, and V44. After accumulation in the tank E2, the finished lithium concentrate is fed through the storage-tank valve V49 using the pump CP3 through the storage tank, draining manifold OL2 to further processing. The desorption process is carried out in other columns in a similar manner.

Thus, the claimed apparatus AP for the ion-exchange extraction of lithium from natural or process brine allows for the interchangeable supply and removal of a stream of brine, wash water, and desorbing solution through the respective output manifolds, depending on the specific conditions of the system and demand for supplying the above flows to specific ion-exchange columns. Such conditions may occur when it is necessary to provide periodic flushing of the columns and pipelines for restoring their normal hydrodynamic operation, eliminating siltation, preventing local crystallization of salts from brine, etc.

The invention was described concerning specific examples of the apparatus and method. It is understood, however, that these examples should be construed as limiting the scope of the invention application and that any changes and modifications are possible if they are made within the scope of the attached claims. For example, the number of columns may be less or greater than four. Different ion-exchange columns of the apparatus may selectively operate both in sequential and parallel modes without violation of continuity of the process. The switchable shut-off valves may be switched on or off in an arbitrary pattern following specific needs of the process. Sorbents other than those indicated may be used.

The invention claimed is:

1. A method for versatile continuous ion-exchange extraction of lithium from natural or technological lithium-containing brine having a predetermined concentration of lithium by using a lithium-selective inorganic sorbent; the method comprises:
   a) providing an apparatus comprising: ion-exchange columns comprising a first ion-exchange column, a last ion-exchange column, and intermediate ion-exchange columns between the first ion-exchange column and the last ion-exchange column, the total number of the columns being n, wherein n is a number equal to or exceeding 3, each of the ion-exchange columns having an input unit and an output unit, the ion-exchange columns being sequentially interconnected; an acid desorption tank; an acid dilution reactor; a storage tank; a brine supply manifold for suppling an untreated, lithium-containing brine to the columns; a pipeline for supplying a dilution acidic desorption solution; a flush water supply pipeline; a waste output pipeline; a storage tank draining pipeline; and a plurality of switchable shut-off valves capable of switching interconnections between the ion-exchange columns, the acid desorption tank, the acid dilution reactor, the storage tank, the brine supply manifold, the pipeline for supplying an acidic desorption solution, the flush water supply pipeline, the waste output pipeline, and the storage tank draining pipeline, wherein the switching interconnections being performed in compliance with a technological process used for carrying out the method;
   b) electing operation of the apparatus between:
   1) a parallel mode of operation at which all ion-exchange columns operate simultaneously and similarly by being filled with the untreated natural or technological brine, subject to a sorption operation for obtaining a processed brine, flushed with flush water for removing a lithium-contain ng residue remained in the ion-exchange columns after the sorption operation, subject to a desorption operation performed by passing therethrough the acidic desorption solution prepared in the acid dilution reactor thus forming a desorption solution, and outputting the desorption solution to the storage tank and then to the storage tank draining pipeline for further processing;
   2) a serial mode of operation comprising performing subsequent cycles of sorption-washing-desorption-washing in each column in sequence from the first ion-exchange column to the last ion-exchange column through the intermediate ion-exchange columns with the transfer of a brine processed in each ion-exchange column from the first ion-exchange column to the last ion-exchange column through the intermediate ion-exchange columns, and converting the last ion-exchange column into the first ion-exchange column upon completion of the last one of the subsequent cycles of sorption-washing-desorption-washing by transferring a brine processed in the last ion-exchange column to the first ion-exchange column further comprising sending the flush water after each flushing to the waste output pipeline checking in the serial mode of operation a content of lithium in the acidic desorption solution and switching appropriate shut-off valves of said plurality of switchable shut-off valves for sending the acidic desorption solution to the acid dilution reactor via the acid desorption tank when the content of lithium is still lower a predetermined value at which the desorption solution is used for further processing outside the apparatus.

2. The method of claim 1 further comprises a step of discontinuing the sorption operation in each ion-exchange column when the lithium concentration in the processed brine reaches the predetermined level of lithium concentration in the natural or technological lithium-containing brine.

3. The method of claim 2, wherein the predetermined level of lithium concentration in the natural or technological lithium-containing brine is higher than 90%.

4. The method of claim 1, comprising checking in the serial mode of operatic n a content of lithium in the acid desorption solution and switching appropriate shut-off valves of said plurality of switchable shut-off valves for sending the acidic desorption solution to the storage tank draining pipeline via the storage tank when the content of lithium in the acidic desorption solution exceeds a predetermined value at which the desorption solution is for further processing outside the apparatus.

5. The method of claim 1 further comprising a step of sending the flush water to the output unit of an ion-exchange column for loosening and washing out a sorbent that hardened in said output unit.

6. The method of claim 3 further comprising a step of sending the flush water to the output unit of an ion-exchange column for loosening and washing out a sorbent that hardened in said output unit.

7. The method of claim 4 further comprising a step of sending the flush water to the output unit of an ion-exchange column for loosening and washing out a sorbent that hardened in said output unit.

8. The method of claim 1 further comprising a step of sending the flush water to the output unit of an on-exchange column for loosening and washing out a sorbent that hardened in said output unit.

* * * * *